US012347249B2

(12) United States Patent
Odawara

(10) Patent No.: US 12,347,249 B2
(45) Date of Patent: Jul. 1, 2025

(54) REPROGRAMMING SYSTEM AND REPROGRAMMING TOOL

(71) Applicant: SUBARU CORPORATION, Tokyo (JP)

(72) Inventor: Kenta Odawara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 308 days.

(21) Appl. No.: 17/978,694

(22) Filed: Nov. 1, 2022

(65) Prior Publication Data

US 2023/0144988 A1    May 11, 2023

(30) Foreign Application Priority Data

Nov. 8, 2021    (JP) .................................. 2021-181722

(51) Int. Cl.
*G07C 5/08*    (2006.01)
*G06F 8/65*    (2018.01)

(52) U.S. Cl.
CPC ............. *G07C 5/0808* (2013.01); *G06F 8/65* (2013.01)

(58) Field of Classification Search
CPC .................................. G06F 8/65; G07C 5/0808
See application file for complete search history.

(56) References Cited

U.S. PATENT DOCUMENTS

2004/0153590 A1 *  8/2004  Roger .................. G11C 16/102
                                                                  710/100
2006/0083173 A1 *  4/2006  Jordan ................ H04L 12/4135
                                                                  370/242

FOREIGN PATENT DOCUMENTS

DE              10257030 A1 *  12/2003 ............. B60R 16/02
JP           2020-167573 A     10/2020

* cited by examiner

*Primary Examiner* — Phillip H Nguyen
(74) *Attorney, Agent, or Firm* — Rimon P.C.

(57) ABSTRACT

A reprogramming system comprises modules that are provided in a vehicle and that comprise a target module for which reprogramming is to be performed and a non-target module coupled to the target module so as to communicate with the target module and a reprogramming tool coupled to the modules so as to communicate with the modules. The reprogramming tool comprises at least one processor and at least one memory coupled to the processor. The processor performs a transmission process to transmit data for the reprogramming to the target module, a retry process to perform the transmission process again if a predetermined condition is met, and a message transmission process to transmit, before the retry process, a message indicating that communication between the reprogramming tool and the target module is being continued to at least the non-target module among the modules.

11 Claims, 4 Drawing Sheets

REPROGRAMMING SYSTEM AND REPROGRAMMING TOOL

CROSS-REFERENCE TO RELATED APPLICATIONS

The present application claims priority from Japanese Patent Application No. 2021-181722 filed on Nov. 8, 2021, the entire contents of which are hereby incorporated by reference.

BACKGROUND

The disclosure relates to a reprogramming system and a reprogramming tool.

Techniques to update programs of various electronic device provided in vehicles (also referred to as "reprogramming") have been proposed in recent years.

For example, Japanese Unexamined Patent Application Publication No. 2020-167573 describes reprogramming of a control apparatus mounted in a vehicle with an external apparatus for reprogramming being connected to the vehicle.

SUMMARY

An aspect of the disclosure provides a reprogramming system. The reprogramming system comprises modules and a reprogramming tool. The modules are configured to be provided in a vehicle and comprise a target module for which reprogramming is to be performed and a non-target module coupled to the target module so as to communicate with the target module. The reprogramming tool is coupled to the modules so as to communicate with the modules. The reprogramming tool comprises one or more processors and one or more memories coupled to the one or more processors. The one or more processors are configured to perform a transmission process to transmit data for the reprogramming to the target module, a retry process to perform the transmission process again in a case where a predetermined condition is met, and a message transmission process to transmit, before the retry process, a message indicating that communication between the reprogramming tool and the target module is being continued to at least the non-target module among the modules.

A reprogramming tool according to an embodiment of the disclosure is configured to be coupled to modules so as to communicate with the modules. The modules are configured to be provided in a vehicle and comprise a target module for which reprogramming is to be performed and a non-target module coupled to the target module so as to communicate with the target module. The reprogramming tool comprises one or more processors and one or more memories coupled to the one or more processors. The one or more processors are configured to perform a transmission process to transmit data for the reprogramming to the target module, a retry process to perform the transmission process again in a case where a predetermined condition is met, and a message transmission process to transmit, before the retry process, a message indicating that communication between the reprogramming tool and the target module is being continued to at least the non-target module among the modules.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

The data capacity of programs for reprogramming tends to increase along with high functionality of a control module for which the reprogramming is to be performed (hereinafter also referred to as a "target module") in recent years. Accordingly, if other modules other than the target module perform communication in transmission of the programs for reprogramming from a reprogramming tool to the target module, concentration of communication may occur to cause a reduction in the communication speed. Consequently, there is a room for improvement in that the reprogramming may not be normally performed.

In order to achieve the improvement, it is desirable to normally perform the reprogramming of the target module using the reprogramming tool.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
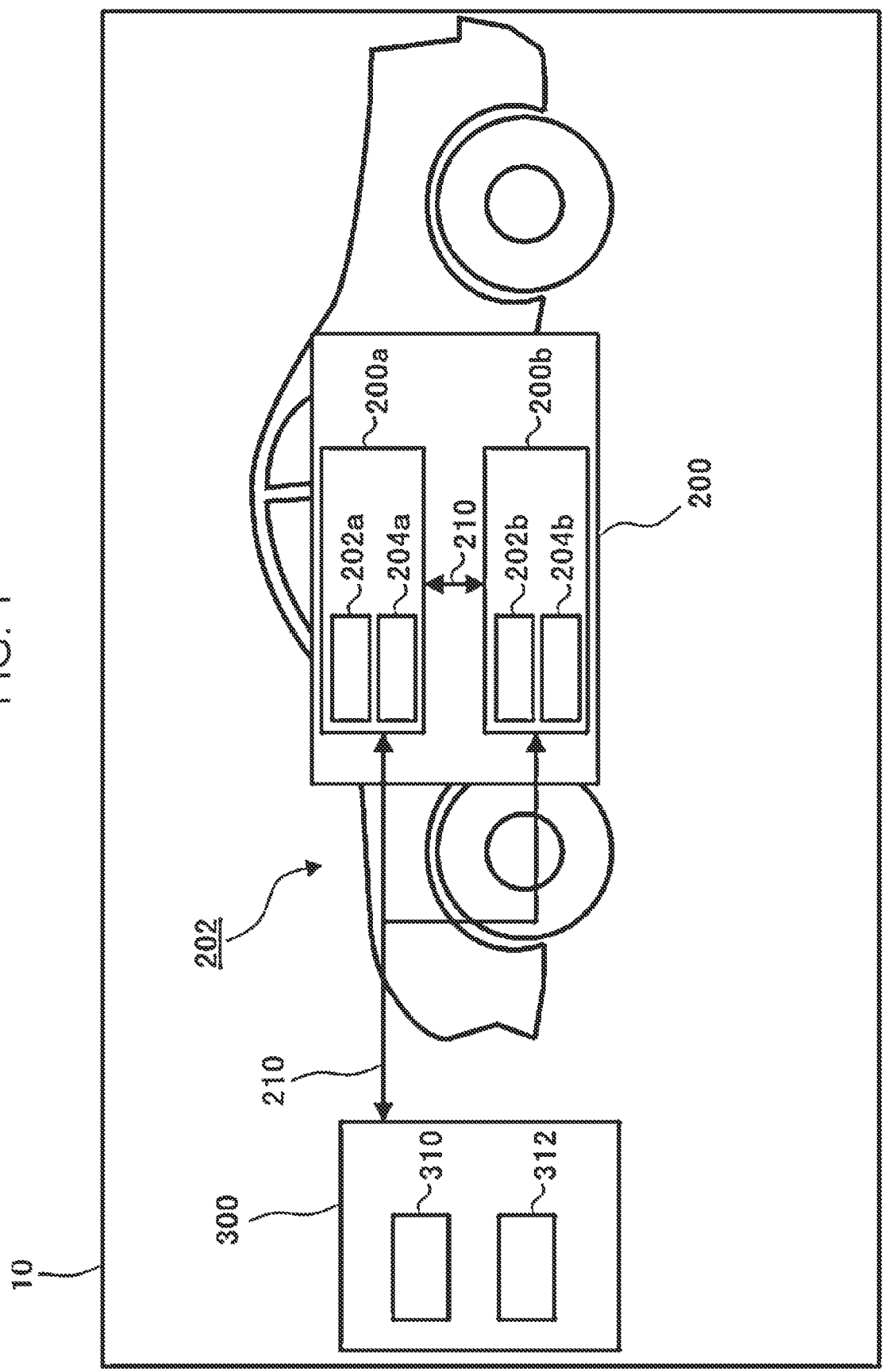
FIG. 1 is a functional block diagram for describing a reprogramming system according to an embodiment of the disclosure.

FIG. 1 is a functional block diagram for describing a reprogramming system 10 according to the embodiment. Referring to FIG. 1, the reprogramming system 10 includes multiple modules 200 provided in a vehicle 202 and a reprogramming tool 300 connected to the modules 200 so as to be capable of communicating with the modules 200. The modules 200 include a target module 200a, which is the module 200 for which reprogramming is to be performed, and one or more non-target modules 200b different from the target module 200a. The modules 200 are connected to each other so as to be capable of communication.

The vehicle 202 is, for example, a hybrid vehicle including an engine and a motor as driving sources.

The target module 200a includes one or more processors 202a and one or more memories 204a connected to the processor 202a or the processors 202a. The non-target modules 200b each include one or more processors 202b and one or more memories 204b connected to the processor 202b or the processors 202b. The processors 202a and 202b each include, for example, a central processing module (CPU). The memories 204a and 204b each include, for example, a read only memory (ROM), a random-access memory (RAM), and so on. The ROM is a storage device that stores programs, arithmetic parameters, and so on used by the CPU. The RAM is a storage device that temporarily stores data about variables, parameters, and so on used in processes performed by the CPU.

The target module 200a and the non-target modules 200b may be control modules of various electronic devices mounted in the vehicle 202 or the likes. In one example, the target module 200a and the non-target modules 200b are, for example, an engine controller that controls the engine, a motor controller that controls the motor, a battery controller that controls a battery, a wireless communication module that wirelessly communicates with a data center outside the vehicle 202, a car navigation system controller that controls a car navigation system, and an automated driving controller that controls automated driving of the vehicle 202. In the present embodiment, the target module 200a for which the reprogramming is to be performed is one module selected from the modules 200 and the non-target modules 200b other than the target module 200a may be provided.

The reprogramming tool 300 includes one or more processors 310 and one or more memories 312 connected to the processor 310 or the processors 310. The processors 310 each include, for example, a CPU. The memories 312 each include, for example, a ROM, a RAM, and so on.

The reprogramming tool 300 is connected to the target module 200a and the non-target modules 200b via, for example, a controller area network (CAN) 210 for communication. The target module 200a is connected to the non-target modules 200b via, for example, the CAN 210 for communication.

The capacity of data for reprogramming tends to increase in recent years. Accordingly, when the reprogramming of the target module 200a is performed, programs for reprogramming are divided into multiple blocks to be transmitted from the reprogramming tool 300 to the target module 200a. The target module 200a writes the programs for reprogramming into the memory 204a for each block that is received to perform the reprogramming.

Each module 200 normally performs the communication with the remaining modules 200 via the CAN 210 for vehicle control to transmit and receive a variety of data. Accordingly, if the communication of the variety of data for vehicle control is performed in the reprogramming of the target module 200a, the communication via the CAN 210 may become busy due to the variety of data for vehicle control to have a room for improvement in that the communication between the reprogramming tool 300 and the target module 200a may be inhibited.

In addition, since the target module 200a is not capable of communicating with the non-target modules 200b during the reprogramming of the target module 200a, communication failure with the target module 200a may be recorded in a diagnosis process performed in the non-target modules 200b.

Accordingly, in a reprogramming process of the target module 200a, it is necessary for the reprogramming tool 300 to stop various processes including the diagnosis process for at least the non-target modules 200b before the reprogramming process is started.

In the present embodiment, the modules 200 are set to any of multiple sessions. For example, the sessions of the modules 200 may include a default session, an extensive diagnostic session, and a reprogramming session. For example, the module 200 for which the default session is set is in a state in which the various processes including the diagnosis process are not capable of being stopped. The module 200 for which the extensive diagnostic session is set stops the various processes including the diagnosis process in response to a request from the reprogramming tool 300. The module 200 for which the reprogramming session is set performs a target-module-side reprogramming process (Step T5) for reprogramming.

Accordingly, in the present embodiment, the reprogramming tool 300 makes a transition of the sessions of at least the non-target modules 200b to the extensive diagnostic session before the reprogramming is started and, then, transmits a diagnosis stop request message to stop the various processes including the diagnosis process for at least the non-target modules 200b. Upon reception of the diagnosis stop request message, the non-target modules 200b are in a standby state for a predetermined time period without performing the recording of the communication failure or the like.

For example, in specifications in which session timeout occurs if the communication with the reprogramming tool 300 is disconnected for a predetermined time period when the session of the module 200 is set to the extensive diagnostic session to make a transition to the default session, there is a room for improvement in that the sessions of the non-target modules 200b may make a transition to the default session before the reprogramming is terminated if it takes a long time for reprogramming. In order to resolve the problem, in the present embodiment, a Tester Present message is transmitted from the reprogramming tool 300 to at least the non-target modules 200b before the predetermined time period elapses. The Tester Present message is a message indicating that the communication between the reprogramming tool 300 and the target module 200a is being continued and are a diagnosis request used in an electronic control unit (ECU) diagnostic communication protocol, such as Unified Diagnostic Services (UDS).

In the transmission of the Tester Present message from the reprogramming tool 300 to the non-target modules 200b, the Tester Present message may be transmitted through so-called unicast communication in which transmission targets are individually specified or may be transmitted through so-called broadcast communication in which all the modules 200 are specified.

In other words, since the Tester Present message is transmitted to all the modules 200 in the transmission of the Tester Present message through the broadcast communication, the Tester Present message is transmitted also to the target module 200a. However, the Tester Present message may be transmitted through the unicast communication with all the modules 200 including the target module 200a and the non-target modules 200b being specified as the transmission targets.

Upon reception of the Tester Present message, the module 200 continues the operation that is being performed in the diagnosis service that has been requested, in the session that is set, over the predetermined time period. In other words, if the non-target module 200b that is performing stop of the various processes including the diagnosis process, which has been requested in the extensive diagnostic session, has received the Tester Present message, the stop of the various processes including the diagnosis process, which has been requested in the extensive diagnostic session, is continued. If the target module 200a that is set to the reprogramming session and that is performing the target-module-side reprogramming process (Step T5) described below has received the Tester Present message, the target-module-side reprogramming process (Step T5) described below is continued in the reprogramming session.

As described above, since the programs for reprogramming are divided into multiple blocks to be transmitted from the reprogramming tool 300 to the target module 200a, the entire time for reprogramming tends to be prolonged. If any communication failure occurs or the writing into the memory 204a fails, a retry process to re-transmit the program of the same block from the reprogramming tool 300 to the target module 200a is performed. Accordingly, there is a room for improvement in that the entire time for reprogramming may be prolonged.

In addition, if the entire time for reprogramming is prolonged, there is a room for improvement in that the predetermined time period may elapse before the reprogramming is terminated to make a transition of the sessions of the non-target modules 200b to the default session. In other words, the diagnosis process of the communication failure may be performed in the non-target modules 200b to record the communication failure with the target module 200a. Accordingly, it is necessary for the reprogramming tool 300 to re-transmit the Tester Present message, which are the message indicating that the communication between the reprogramming tool 300 and the target module 200a is being continued, to at least the non-target modules 200b before the predetermined time period elapses.

However, if the target module 200a has received the Tester Present message from the reprogramming tool 300 while the data for reprogramming is being received or while the received programs for reprogramming are being written into the memories 204a, there is a room for improvement in that the reception of the data for reprogramming or the writing of the received programs for reprogramming into the memories 204a may be stopped to cause the reprogramming not to be normally performed.

Accordingly, in the present embodiment, the reprogramming tool 300 transmits the Tester Present message to at least the non-target modules 200b before the program of each block is transmitted in the retry process. This prevents the target module 200a from receiving the Tester Present message from the reprogramming tool 300 while the target module 200a is receiving the data for reprogramming or while the target module 200a is writing the received programs for reprogramming into the memories 204a. In addition, it is possible to suppress the possibility of making a transition of the sessions of the non-target modules 200b to the default session and the possibility of performing the diagnosis process of the communication failure in the non-target modules 200b to normally perform the reprogramming of the target module 200a using the reprogramming tool 300.

Figure 2:
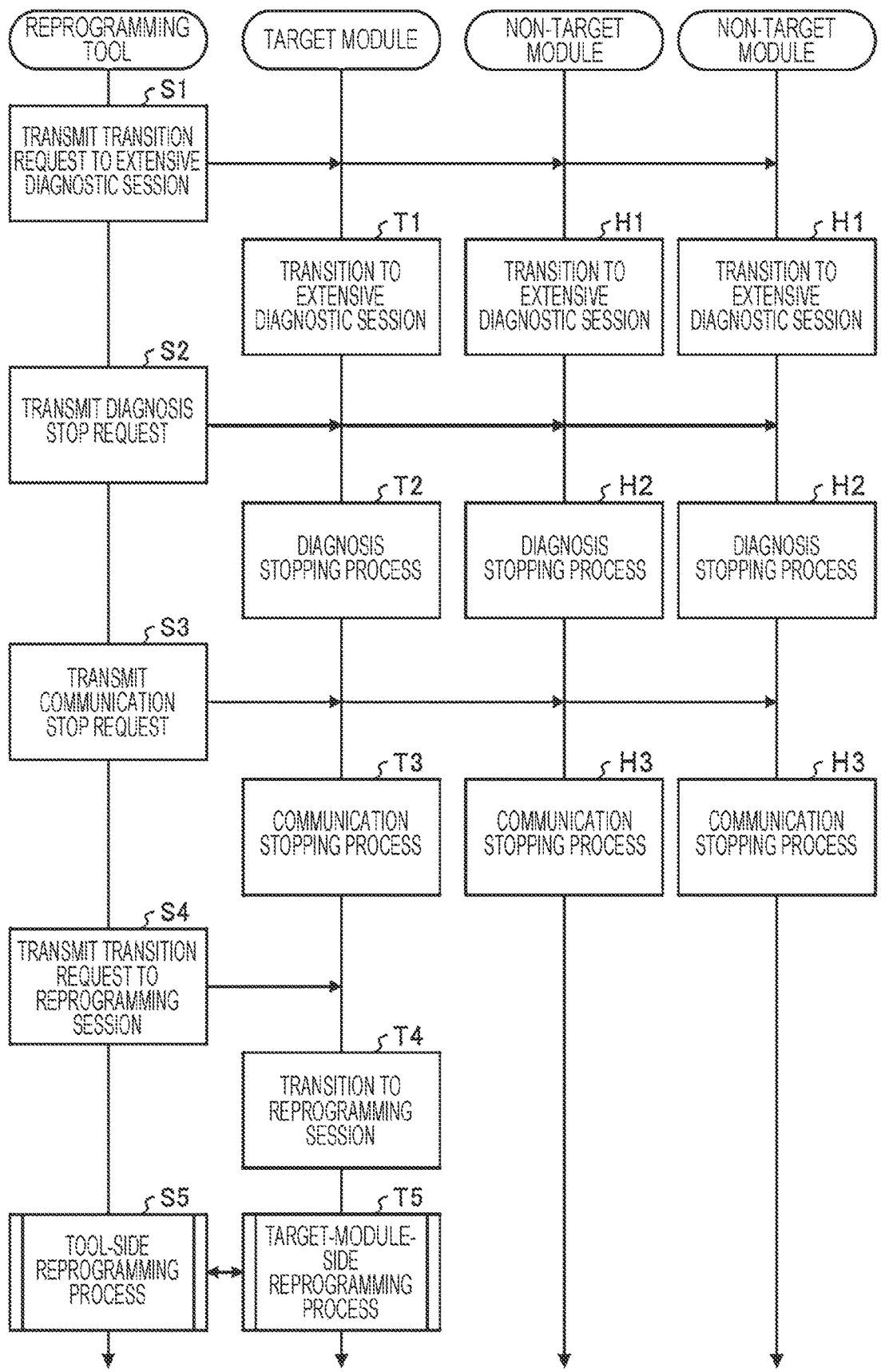
FIG. 2 is a sequence diagram for describing a process flow between a reprogramming tool and modules according to the embodiment of the disclosure.

FIG. 2 is a sequence diagram for describing a process flow between the reprogramming tool 300 and the modules 200, according to the embodiment of the disclosure. The various processes including the process described here may be performed by the processor 310 in the reprogramming tool 300, the processor 202a in the target module 200a, or the processor 202b in the non-target module 200b.

When an ignition power supply (IG power supply) of the vehicle 202 is controlled to be changed from IG-OFF to IF-ON, the sessions of the modules 200 are set to the default session. As described above, the sessions are set in the modules 200 and at least the default session, the extensive diagnostic session, and the reprogramming session are provided as the sessions of the modules 200 in the present embodiment.

Referring to FIG. 2, in Step S1, the reprogramming tool 300 transmits a transition request to the extensive diagnostic session to the target module 200a and the non-target modules 200b. At this time, the transition request to the extensive diagnostic session may be transmitted through the broadcast communication or may be transmitted through the unicast communication with all the modules 200 including the target module 200a and the non-target modules 200b being specified as the transmission targets.

Upon reception of the transition request to the extensive diagnostic session from the reprogramming tool 300, in Step T1, the target module 200a makes a transition to the extensive diagnostic session.

Upon reception of the transition request to the extensive diagnostic session from the reprogramming tool 300, in Step H1, the target modules 200b make a transition to the extensive diagnostic session.

Upon reception of various messages from the reprogramming tool 300, the modules 200 for which the extensive diagnostic session is set perform processes corresponding to the received messages.

In Step S2, the reprogramming tool 300 transmits a diagnosis stop request message to the target module 200a and the non-target modules 200b. At this time, the diagnosis stop request message may be transmitted through the broadcast communication or may be transmitted through the unicast communication with all the modules 200 including the target module 200a and the non-target modules 200b being specified as the transmission targets. The reprogramming tool 300 may transmit the Tester Present message to the target module 200a and the non-target modules 200b after transmitting the diagnosis stop request message to the target module 200a and the non-target modules 200b.

Upon reception of the diagnosis stop request message from the reprogramming tool 300, in Step T2, the target module 200a is in the standby state for the predetermined time period without recording the communication failure or the like.

Upon reception of the diagnosis stop request message from the reprogramming tool 300, in Step H2, the non-target modules 200b are in the standby state for the predetermined time period without recording the communication failure or the like.

In Step S3, the reprogramming tool 300 transmits a communication stop request message to the target module 200a and the non-target modules 200b. At this time, the communication stop request message may be transmitted through the broadcast communication or may be transmitted through the unicast communication with all the modules 200 including the target module 200a and the non-target modules 200b being specified as the transmission targets. The reprogramming tool 300 may transmit the Tester Present message to the target module 200a and the non-target modules 200b after transmitting the communication stop request message to the target module 200a and the non-target modules 200b.

Upon reception of the communication stop request message from the reprogramming tool 300, in Step T3, the target module 200a is in the standby state for the predetermined time period without transmitting the various messages.

Upon reception of the communication stop request message from the reprogramming tool 300, in Step H3, the non-target modules 200b are in the standby state for the predetermined time period without transmitting the various messages.

As described above, the session timeout occurs in the module 200 for which the extensive diagnostic session is set if the communication with the reprogramming tool 300 is disconnected for the predetermined time period and the module 200 makes a transition to the default session. Accordingly, the module 200 terminates the stop of the various processes including the diagnosis process, which has been requested in the extensive diagnostic session, if the communication with the reprogramming tool 300 is disconnected for the predetermined time period to make a transition to the default session.

However, if the Tester Present message is received before the communication with the reprogramming tool 300 is continued for the predetermined time period, the module 200 is in the standby state without making a transition to the default session until the predetermined time period further elapses since the Tester Present message has been received last time. Accordingly, the module 200 continues the stop of the various processes including the diagnosis process, which has been requested in the extensive diagnostic session, if the Tester Present message is received before the communication with the reprogramming tool 300 is continued for the predetermined time period.

In Step S4, the reprogramming tool 300 transmits a transition request to the reprogramming session to the target module 200a. In Step S5, the reprogramming tool 300 starts a tool-side reprogramming process described below. At this time, the transition request to the reprogramming session may be transmitted through the unicast communication with the target module 200a being specified as the transmission target.

Upon reception of the transition request to the reprogramming session from the reprogramming tool 300, in Step T4, the target module 200a makes a transition to the reprogramming session. In Step T5, the target module 200a starts the target-module-side reprogramming process.

Figure 3:
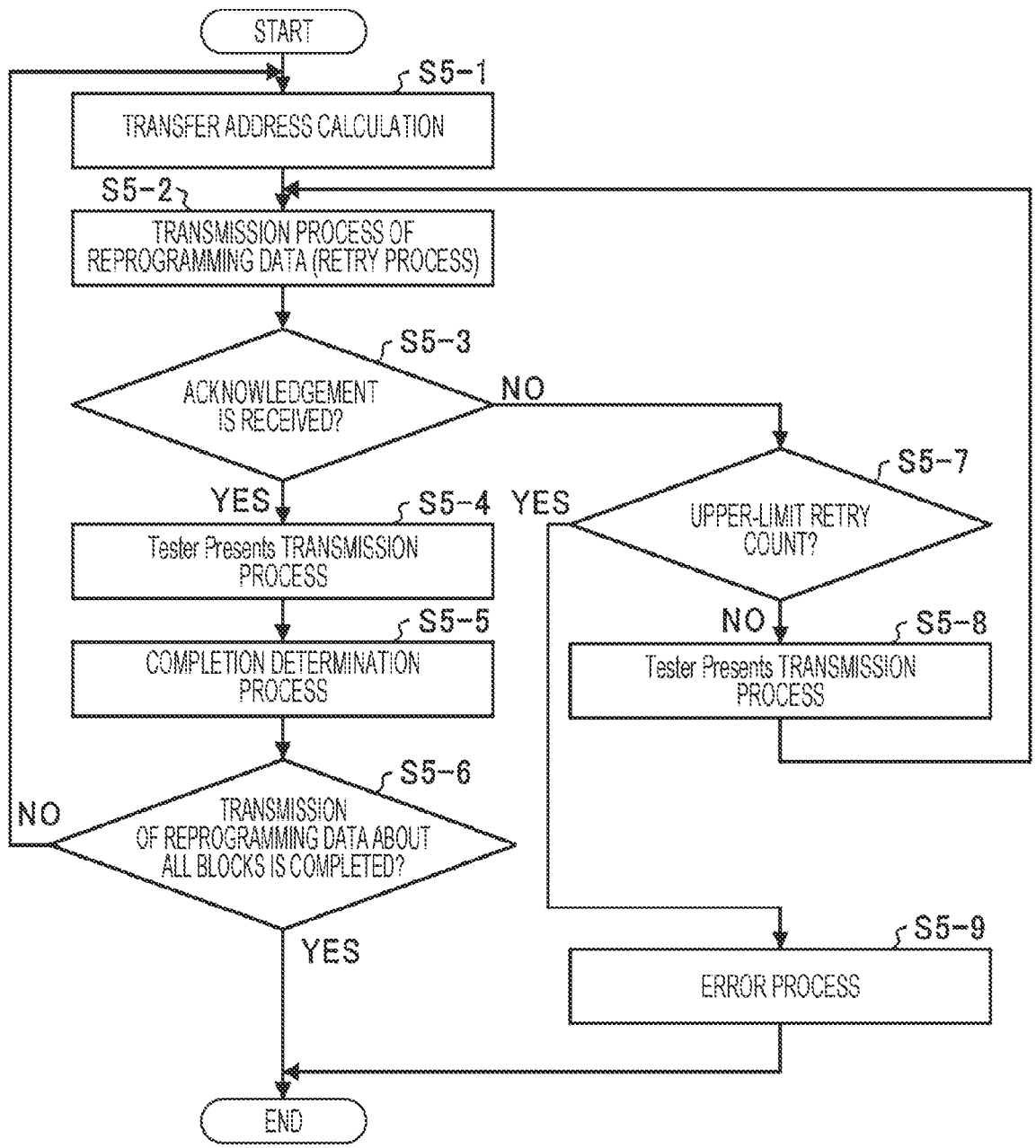
FIG. 3 is a flowchart illustrating a tool-side reprogramming process, which is performed by the reprogramming tool, according to the embodiment of the disclosure.

FIG. 3 is a flowchart illustrating the tool-side reprogramming process (Step S5), which is performed by the reprogramming tool 300, according to the embodiment of the disclosure. The various processes including the process described here may be performed by the processor 310 in the reprogramming tool 300. In particular, the processor 310 executes the programs stored in the memory 312 in the reprogramming tool 300 to perform the various processes in the reprogramming tool 300.

Referring to FIG. 3, in Step S5-1, the reprogramming tool 300 performs transfer address calculation. In one example, the programs for the reprogramming of the target module 200a are divided into multiple blocks in the transfer address calculation. At this time, the programs for the reprogramming of the target module 200a are divided into multiple blocks so that the data capacity of one block is smaller than a predetermined data capacity.

In Step S5-2, the reprogramming tool 300 performs a transmission process to transmit reprogramming data about one block the transmission of which is not completed, among the blocks divided in Step S5-1, to the target module 200a.

In Step S5-3, the reprogramming tool 300 determines whether an acknowledgement message is received from the target module 200a during a predetermined moratorium period. If the acknowledgement message is received from the target module 200a during the moratorium period (YES in Step S5-3), the process goes to Step S5-4. The target module 200a transmits the acknowledgement message to the reprogramming tool 300 if the target module 200a has normally written the reprogramming data about the received block into the memory 204a within a predetermined writing time period although this will be described in detail below. The target module 200a transmits a negative acknowledgement message to the reprogramming tool 300 if the target module 200a has not normally written the reprogramming data about the received block into the memory 204a within the predetermined writing time period.

In Step S5-4, the reprogramming tool 300 performs a Tester Present message transmission process to transmit the Tester Present message to all the modules 200 through the broadcast communication.

In Step S5-5, the reprogramming tool 300 performs a completion determination process to determine whether the transmission of the reprogramming data about all the blocks divided in Step S5-1 is completed.

In Step S5-6, the reprogramming tool 300 determines whether the transmission of the reprogramming data about all the blocks is completed. If the reprogramming tool 300 determines that the transmission of the reprogramming data about all the blocks is completed in Step S5-5 (YES in Step S5-6), the tool-side reprogramming process illustrated in FIG. 3 is terminated. If the reprogramming tool 300 determines that the transmission of the reprogramming data about all the blocks is not completed in Step S5-5 (NO in Step S5-6), the process goes back to Step S5-1 to sequentially transmit the reprogramming data about each block.

If the acknowledgement message is not received from the target module 200a during the predetermined moratorium period (NO in Step S5-3), the process goes to Step S5-7. In Step S5-7, the reprogramming tool 300 determines whether the retry count reaches a predetermined upper-limit retry count. If the retry count does not reach the predetermined upper-limit retry count (NO in Step S5-7), the process goes to Step S5-8. In Step S5-8, the reprogramming tool 300 performs the Tester Present message transmission process to transmit the Tester Present message to all the modules 200 through the broadcast communication.

Then, the process goes back to Step S502. In Step S5-2, the reprogramming tool 300 performs the retry process to transmit the reprogramming data about the same block to the target module 200a again. At this time, the reprogramming tool 300 increments the retry count each time the retry process is performed.

If the retry count reaches the predetermined upper-limit retry count (YES in Step S5-7), the process goes to Step S5-9. In Step S5-9, the reprogramming tool 300 performs a predetermined error process. Then, the tool-side reprogramming process illustrated in FIG. 3 is terminated. In the error process, for example, a worker who performs the reprogramming is notified of failure of the reprogramming.

Figure 4:
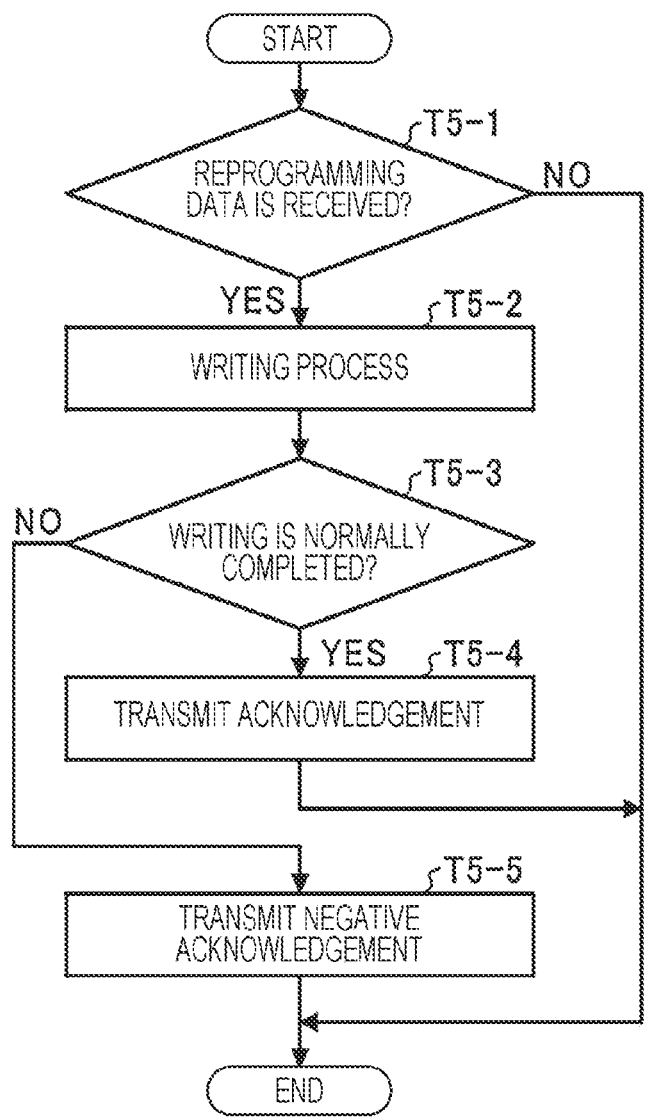
FIG. 4 is a flowchart illustrating a target-module-side reprogramming process, which is performed by a target module, according to the embodiment of the disclosure.

FIG. 4 is a flowchart illustrating the target-module-side reprogramming process (Step T5), which is performed by the target module 200a, according to the embodiment of the disclosure. The various processes including the process described here may be performed by the processor 202a in the target module 200a. In particular, the processor 202a executes the programs stored in the memory 204a in the target module 200a to perform the various processes in the target module 200a.

Referring to FIG. 4, in Step T5-1, the target module 200a determines whether the reprogramming data is received from the reprogramming tool 300. If the reprogramming data is received (YES in Step T5-1), the process goes to Step T5-2.

In Step T5-2, the target module 200a performs a writing process to write the reprogramming data about the received block into the memory 204a.

In Step T5-3, the target module 200a determines whether the reprogramming data about the received block is normally written into the memory 204a within the predetermined writing time period in Step T5-2. If the writing is normally completed (YES in Step T5-3), the process goes to Step T5-4. In Step T5-4, the target module 200a transmits the acknowledgement message to the reprogramming tool 300. Then, the target-module-side reprogramming process illustrated in FIG. 4 is terminated.

If the writing is not normally completed (NO in Step T5-3), the process goes to Step T5-5. In Step T5-5, the target module 200a transmits the negative acknowledgement message to the reprogramming tool 300. Then, the target-module-side reprogramming process illustrated in FIG. 4 is terminated.

If the reprogramming data is not received (NO in Step T5-1), the target-module-side reprogramming process illustrated in FIG. 4 is terminated.

As described above, the reprogramming system 10 according to the embodiment of the disclosure includes the modules 200 that are configured to be provided in the vehicle 202 and that include the target module 200a for which reprogramming is to be performed and the non-target module 200b configured to be connected to the target module 200a so as to be capable of communicating with the target module 200a, and the reprogramming tool 300 configured to be connected to the modules 200 so as to be capable of communicating with the modules 200. The reprogramming tool 300 includes the one or more processors 310 and the one or more memories 312 configured to be connected to the processor 310 or the processors 310. The processor 310 performs a transmission process to transmit data for the reprogramming to the target module 200a, a retry process to perform the transmission process again if a predetermined condition is met, and a message transmission process to transmit a message indicating that communication between the reprogramming tool 300 and the target module 200a is being continued to at least the non-target module 200b, among the modules 200, before the retry process.

As described above, the reprogramming tool 300 according to the embodiment of the disclosure is configured to be connected to the modules 200 so as to be capable of communicating with the modules 200. The modules 200 are configured to be provided in the vehicle 202 and include the target module 200a for which reprogramming is to be performed and the non-target module 200b configured to be connected to the target module 200a so as to be capable of communicating with the target module 200a. The reprogramming tool 300 includes the one or more processors 310 and the one or more memories 312 configured to be connected to the processor 310 or the processors 310. The processor 310 performs a transmission process to transmit data for the reprogramming to the target module 200a, a retry process to perform the transmission process again if a predetermined condition is met, and a message transmission process to transmit a message indicating that communication between the reprogramming tool 300 and the target module 200a is being continued to at least the non-target module 200b, among the modules 200, before the retry process.

With the reprogramming system 10 and the reprogramming tool 300 according to the embodiment of the disclosure described above, it is possible to prevent the target module 200a from receiving the Tester Present message from the reprogramming tool 300 while the target module 200a is receiving the data for reprogramming or while the target module 200a is writing the received programs for reprogramming into the memories 204b.

In addition, it is possible to suppress the possibility of making a transition of the sessions of the non-target modules 200b to the default session and the possibility of performing the diagnosis process of the communication failure in the non-target module 200b before the reprogramming is terminated. This enables the reprogramming of the target module 200a using the reprogramming tool 300 to be normally performed.

In the reprogramming system 10 and the reprogramming tool 300 according to the embodiment of the disclosure, the modules 200 may continue an operation that is being performed for a predetermined time period upon reception of the message indicating that the communication between the reprogramming tool 300 and the target module 200a is being continued. The processor 310 may not transmit the message indicating that the communication between the reprogramming tool 300 and the target module 200a is being continued to the target module 200a during the transmission process and during the retry process. In this case, it is possible to suppress the possibility of making a transition of the sessions of the non-target modules 200b to the default session and the possibility of performing the diagnosis process of the communication failure in the non-target module 200b before the reprogramming is terminated. In addition, it is possible to reduce the possibility of the busy communication via the CAN 210 to inhibit the communication between the reprogramming tool 300 and the target module 200a.

In the reprogramming system 10 and the reprogramming tool 300 according to the embodiment of the disclosure, the processor 310 in the reprogramming tool 300 may transmit the message indicating that the communication between the reprogramming tool 300 and the target module 200a is being continued to all the modules 200 in the message transmission process. In this case, since it is not necessary to perform the determination of whether the message indicating that the communication between the reprogramming tool 300 and the target module 200a is being continued is transmitted for each destination, it is possible to reduce the processing load on the processor 310 in the reprogramming tool 300. For example, as in the embodiment of the disclosure, the message indicating that the communication between the reprogramming tool 300 and the target module 200a is being continued may be transmitted to all the modules 200 through the broadcast communication. This enables the processing load to be further reduced, compared with the unicast communication in which the transmission targets are individually specified.

In the reprogramming system 10 and the reprogramming tool 300 according to the embodiment of the disclosure, the message indicating that the communication between the reprogramming tool 300 and the target module 200a is being continued may be the Tester Present message, which is a diagnosis request used in the ECU diagnostic communication protocol. Since the Tester Present message is capable of being generally used on the CAN used by an in-vehicle ECU, it is possible to reduce the introduction cost and the development cost.

Although the embodiment of the disclosure are described above with reference to the attached drawings, the disclosure is not limited to the above embodiment. It is obvious to the person skilled in the art to make various changes and modifications in the scope of the appended claims. Such changes and modifications are considered to be included in the technical range of the disclosure.

Although the vehicle 202 of the hybrid type is described in the above embodiment, the disclosure is not limited to the hybrid vehicle 202. The disclosure is applicable to various vehicle types including a gasoline vehicle, an electric vehicle (EV), a plug-in hybrid electric vehicle (PHEV), and a non-plug-in hybrid vehicle (a hybrid vehicle).

Although the example is described in the above embodiment, in which an external apparatus including the reprogramming tool 300 is connected to the vehicle 202, the disclosure is not limited to this example. In one example, a module having the function of the reprogramming tool 300 described in the above embodiment may be built in the vehicle 202.

The target module 200*a*, the non-target module 200*b*, and the reprogramming tool 300 illustrated in FIG. 1 can be implemented by circuitry including at least one semiconductor integrated circuit such as at least one processor (e.g., a central processing module (CPU)), at least one application specific integrated circuit (ASIC), and/or at least one field programmable gate array (FPGA). At least one processor can be configured, by reading instructions from at least one machine readable tangible medium, to perform all or a part of functions of the target module 200*a*, the non-target module 200*b*, and the reprogramming tool 300. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A reprogramming system comprising:
   modules configured to be provided in a vehicle, the modules comprising a target module for which reprogramming is to be performed and a non-target module coupled to the target module so as to communicate with the target module; and
   a reprogramming tool coupled to the modules so as to communicate with the modules,
   wherein the reprogramming tool comprises
      one or more processors, and
      one or more memories coupled to the one or more processors,
   wherein the modules are set to one of sessions including:
      a first session in which various processes including a diagnosis process are not stoppable;
      a second session in which the various processes including the diagnosis process are stoppable in response to a request from the reprogramming tool; and
      a third session in which the target module performs a reprogramming process,
   wherein the modules are configured to:
      maintain, in response to reception of a first message, the one of the sessions over a first time period;
      switch, in response to having no communication with the reprogramming tool for a second time period while being set to the second session, the one of the sessions from the second session to the first session; and
      stop, in response to receiving a second message while being set to the second session, the various processes, and wherein the one or more processors are configured to:
      set the non-target module to the second session and transmit the second message to the set non-target module;
      set the target module to the third session;
      after transmitting the second message to the set non-target module and setting the target module to the third session, perform a data transmission process including transmitting data for the reprogramming to the set target module;
      in response to a predetermined condition being met after a start of the data transmission process, perform a message transmission process including transmitting the first message to at least the set non-target module; and
      after performing the message transmission process, perform a retry process to perform the data transmission process again.

2. The reprogramming system according to claim 1, wherein the one or more processors are further configured to:
   divide the data for the reprogramming to the set target module into blocks;
   perform the data transmission process to sequentially transmit the blocks to the set target module;
   in response to the predetermined condition being met after transmitting one of the blocks to the target module, perform the message transmission process including transmitting the first message to at least the set non-target module; and
   after performing the message transmission process, perform the retry process to perform the data transmission process of the one of the blocks again.

3. The reprogramming system according to claim 1, wherein the first message indicates that communication between the reprogramming tool and the target module is being continued.

4. A reprogramming tool configured to be coupled to modules so as to communicate with the modules, the modules being configured to be provided in a vehicle and comprising a target module for which reprogramming is to be performed and a non-target module coupled to the target module so as to communicate with the target module, the reprogramming tool comprising:
   one or more processors; and
   one or more memories coupled to the one or more processors,
   wherein the modules are set to one of sessions including:
      a first session in which various processes including a diagnosis process are not stoppable;
      a second session in which the various processes including the diagnosis process are stoppable in response to a request from the reprogramming tool; and
      a third session in which the target module performs a reprogramming process,
   wherein the modules are configured to:
      maintain, in response to receiving a first message, the one of the sessions over a first time period;
      switch, in response to having no communication with the reprogramming tool for a second time period while being set to the second session, the one of the sessions from the second session to the first session; and
      stop, in response to receiving a second message while being set to the second session, the various processes, and wherein the one or more processors are configured to:
set the non-target module to the second session and transmit the second message to the set non-target module;
set the target module to the third session;
after transmitting the second message to the set non-target module and setting the target module to the third session, perform a data transmission process including transmitting data for the reprogramming to the target module;
in response to a predetermined condition being met after a start of the data transmission process, perform a message transmission process including transmitting the first message to at least the set non-target module; and
after performing the message transmission process, perform a retry process to perform the data transmission process again.

5. The reprogramming tool according to claim 4,
wherein the modules are configured to continue an operation that is performed for a predetermined time period upon the reception of the first message, and
wherein the one or more processors do not transmit the first message to the target module during the data transmission process and during the retry process.

6. The reprogramming tool according to claim 5,
wherein the one or more processors transmit the first message to all the modules in the message transmission process.

7. The reprogramming tool according to claim 6,
wherein the first message is a Tester Present message that is a diagnosis request used in an electronic control unit diagnostic communication protocol.

8. The reprogramming tool according to claim 5,
wherein the first message is a Tester Present message that is a diagnosis request used in an electronic control unit diagnostic communication protocol.

9. The reprogramming tool according to claim 4,
wherein the first message is a Tester Present message that is a diagnosis request used in an electronic control unit diagnostic communication protocol.

10. The reprogramming tool according to claim 4, wherein the one or more processors are further configured to:
divide the data for the reprogramming to the set target module into blocks;
perform the data transmission process to sequentially transmit the blocks to the set target module;
in response to the predetermined condition being met after transmitting one of the block to the target module, perform the message transmission process including transmitting the first message to at least the set non-target module; and
after performing the message transmission process, perform the retry process to perform the data transmission process of the one of the blocks again.

11. The reprogramming tool according to claim 4, wherein the first message indicates that communication between the reprogramming tool and the target module is being continued.

* * * * *